July 28, 1942.  S. T. POWELL  2,291,344
APPARATUS FOR MANUFACTURING INSULATED WIRE
Filed June 11, 1941
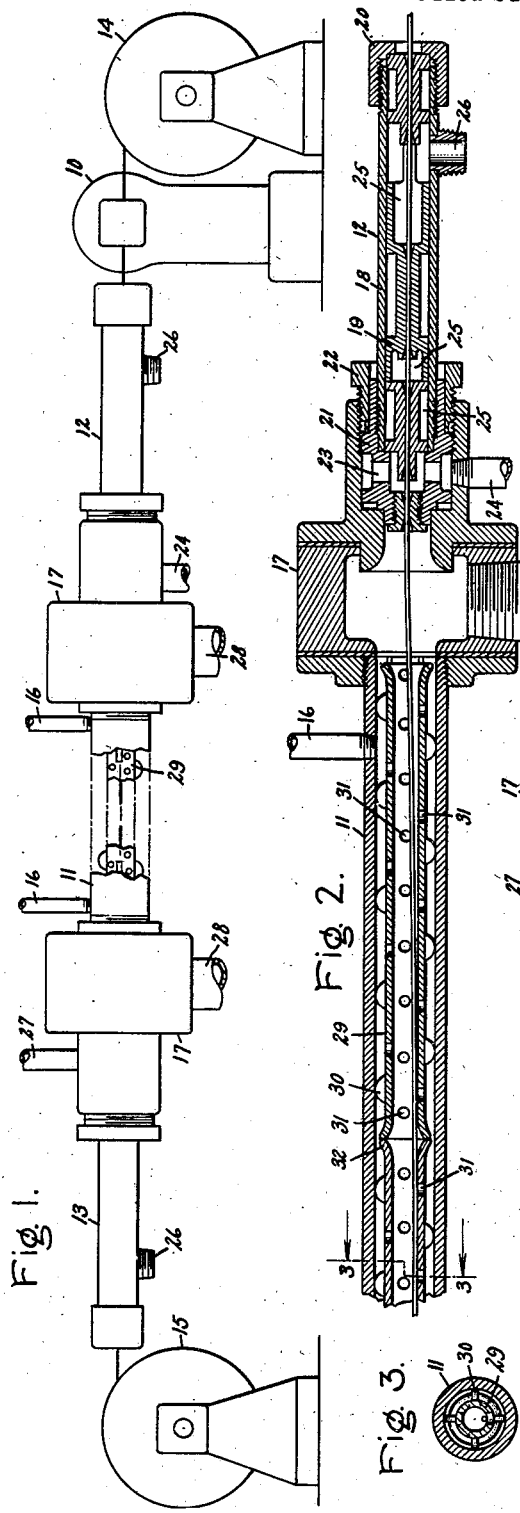
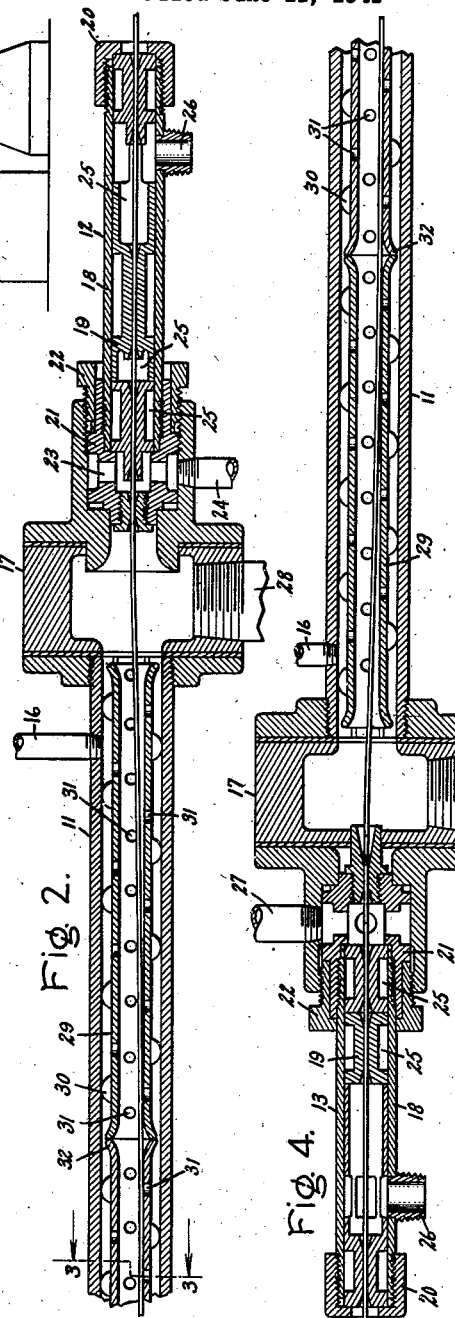
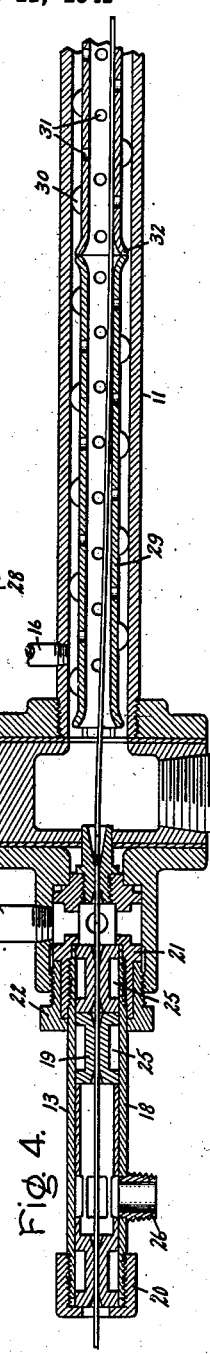
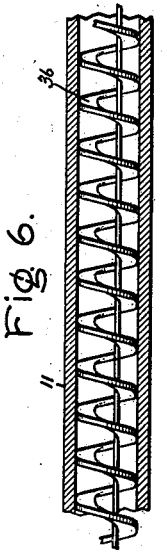
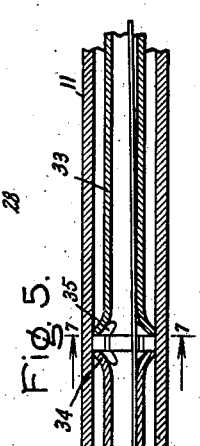
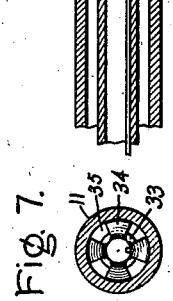
Inventor:
Samuel T. Powell,
by Harry E. Dunham
His Attorney.

Patented July 28, 1942

2,291,344

UNITED STATES PATENT OFFICE 2,291,344

APPARATUS FOR MANUFACTURING INSULATED WIRE

Samuel T. Powell, Fairfield, Conn., assignor to General Electric Company, a corporation of New York Application June 11, 1941, Serial No. 397,585

5 Claims. (Cl. 18—6)

My invention relates to the manufacture of insulated wire by a continuous process and more particularly to the manufacture of wire having a vulcanizable coating by a continuous curing or vulcanizing process.

The object of my invention is to provide an improved apparatus for the manufacture of insulated wire, particularly apparatus for increasing the speed with which the wire covering may be cured with a resulting improvement in the product.

In the accompanying drawing, Fig. 1 is a diagrammatic view of an apparatus embodying my invention for curing a wire coated with vulcanizable material; Fig. 2 is a sectional view through the entrance end of the vulcanizing apparatus; Fig. 3 is a sectional view through a vulcanizing chamber taken along the line 3—3 of Fig. 2; Fig. 4 is a sectional view through the exit end of the vulcanizing apparatus; Figs. 5 and 6 are sectional views through the vulcanizing chamber showing modifications thereof; and Fig. 7 is a sectional view taken along the line 7—7 of Fig. 5.

In the manufacture of insulated wire coated with a vulcanizable material a continuous process has been utilized in curing extremely long lengths of coated wire. Such process employs apparatus shown diagrammatically by Fig. 1, which includes an extrusion press 10 and a vulcanizing chamber 11 closed at opposite ends by entrance and exit seals 12 and 13, respectively, together with means for passing the coated wire through the vulcanizing chamber including a pay-off capstan 14 and a take-up capstan 15. The wire to be insulated is drawn from the capstan 14 through the extrusion press 10, where the vulcanizable coating is applied thence through the entrance seal 12 into the vulcanizing chamber 11. After being vulcanized, the coated wire passes through exit seal 13 and is wound around the take-up capstan 15. Usually, the vulcanizing medium employed in the chamber 11 is steam which is fed to the chamber through a plurality of inlet pipes 16, two of which have been shown although the number of inlet pipes may be varied depending upon the length of the vulcanizing chamber.

Vulcanizing chambers used with the apparatus described are of considerable length to provide a sufficiently long period of contact between the vulcanizing medium and the coated wire to insure complete curing as the wire is passed continuously through the chamber since the wire must be fully cured when wound on the take-up capstan 15. In some instances, the chamber may be as long as 200 feet or more.

Customarily, the vulcanizing chamber 11 is disposed in a horizontal plane due to its great length. When so disposed, it will be apparent that the steam condensate caused by cooling during vulcanization of the coating will collect along the bottom of the chamber and will flow along the length of the chamber to drain openings provided adjacent the seals at each end of the chamber. In former constructions of the apparatus, the coated conductor was entirely unsupported throughout the length of the vulcanizing chamber 11. Consequently, it dragged along the bottom of the chamber since it could not be put under sufficient tension to maintain it above the bottom of the chamber due to the plastic condition of the vulcanizable coating upon entering the chamber. This meant that the coated conductor was partially immersed in the pools of condensate which collected at various points along the bottom of the vulcanizing chamber. Since the condensate, due to heat losses in the wire and vulcanizing chamber, is ordinarily at a considerably lower temperature than that of the vulcanizing steam, the speed of vulcanization of the coating was seriously impaired due to the fact that the coating was surrounded at many points along its length by the comparatively low temperature condensate rather than by the high temperature steam. This resulted in the necessity for increased curing time reducing the speed at which the wire could be passed through the chamber. In aggravated cases, blemishes might occur on the surface of the coating. I propose to overcome these deficiencies by providing maens in the vulcanizing chamber to support the coated conductor out of contact with the condensate so that at all times it is surrounded by the high temperature vulcanizing medium.

Referring to Figs. 2 to 7 of the drawing, I have shown my invention applied to apparatus of the type described in the Forstrom and Hull Patent 2,069,087, assigned to the same assignee as the instant application. The arrangement of the entrance seal and vulcanizing chamber will now be briefly described in relation to my invention; for a more detailed description of the sealing structure, reference may be made to the Forstrom and Hull patent.

The entrance end of the vulcanizing chamber 11 is secured to a hollow head 17 on which the aforementioned entrance seal 12 is mounted. This seal comprises a tube 18 containing a plurality of glands 19 having openings therein for receiving the coated conductor. The glands are located in side by side relationship within the tube 18 and are held in position by a cap 20 threaded on the end of the tube. The tube 18 is threaded into a gland 21 which in turn is mounted in position on the head 17 by a threaded nut 22. The gland 21 is provided with a plurality of annularly arranged openings 23 so that fluid from an inlet pipe 24 is accessible to the interior of the gland and tube 18. In order to confine the vulcanizing medium in the chamber 11 and prevent it from entering the gland 23 and the tube 18, the fluid is maintained at a pressure slightly higher than that of the steam. Customarily, the sealing fluid employed is water but in some cases, a gas may be employed. The water passes through the glands 19 along the tube 18, the glands being provided with enlarged openings 25 which restrict the flow of water and reduce the pressure along the length of the tube 18 so that when the water drains through an outlet opening 26, it is no longer under pressure. The number of glands employed in the tube 18 and the length of the tube forming the seal depend upon the pressure of the vulcanizing medium and the pressure of the sealing fluid. These will vary according to the particular installation. Referring to Fig. 4, it will be apparent that the exit end of the vulcanizing chamber 11 is likewise provided with a sealing means which in all respects is similar to the entrance seal just described, the sealing liquid being fed to the seal through an inlet pipe 27.

The vulcanizing steam from the inlets 16 surrounds the coated conductor throughout the entire length of the vulcanizing chamber 11 and as the steam is cooled down during the vulcanizing process, the condensate collects on the bottom of the chamber and is drained off at either end by drain pipes 28. If desired, drain pipes may be placed at intermediate points along the length of the vulcanizing chamber but for the purposes of illustration, the drain pipes have been shown as located at opposite ends of the chamber.

In prior constructions, when the coated wire entered the vulcanizing chamber, the weight of the wire caused it to sag downwardly in the manner indicated by Figs. 2 and 4, so that it tended to rest on the bottom of the chamber in contact with the condensate. Since the condensate is at a lower temperature than the steam, the condensate tended to cool down the coating on the wire, retarding the speed of cure. According to my invention, however, means are provided for maintaining the coated conductor out of contact with the condensate in the bottom of the chamber.

To this end, I provide the vulcanizing chamber with a liner, which in the form of the invention shown by Fig. 2, comprises a tube 29 having fins 30 extending from its exterior surface for engagement with the walls of the vulcanizing chamber so that the liner 29 is maintained spaced from the walls of the chamber. The tube is provided with a plurality of openings 31 extending along the length thereof. As many tubes as necessary may be placed end to end throughout the length of the vulcanizing chamber. The ends of the tubes are flared outwardly as shown at 32 to avoid any rough spots which might damage the coating on the wire at the points where the ends of the tubes make contact with each other. The coated wire passes through the interior of the tube so that it is maintained out of contact with the bottom wall of the vulcanizing chamber. In this position, the wire rests on and moves along the bottom wall of the tube so that those portions of the tubes between the openings form, in effect, a plurality of surfaces supporting the coated wire out of contact with the steam condensate.

In operation, any condensate caused by cooling of the steam in contact with the vulcanizable coating will form on the bottom of the liner 29 but, instead of collecting there in pools of sufficient size to cool the coating and impair the vulcanizing action of the steam, will immediately drain through the openings 31 to the bottom of the vulcanizing chamber 11 and thence along the wall of the chamber to the drain pipes 28. In this manner, the coated conductor is maintained out of contact with the condensate at all times so that there is no impairment of the vulcanizing action of the steam. It has been found in actual practice that by keeping the coated wire out of contact with the condensate, the rate of vulcanization of the wire is markedly increased with a corresponding improvement in the quality of the vulcanizable coating. Moreover, it is possible to increase the speed at which the wire is drawn through the curing chamber with a resulting saving in cost.

In some installations, the pressure of the water in the seals at the entrance and exit ends of the vulcanizing tube is such that a small amount of the water may drain into the heads 17 and along the ends of the vulcanizing chamber 11 for a relatively short distance. Since this water is at room temperature, it would have an undue cooling effect on the vulcanizable coating were it not for the fact that the liner 29 maintains the wire out of contact with any of the sealing liquid which may inadvertently enter chamber 11. Normally, the small flow of sealing liquid into the vulcanizing chamber is removed by the drain pipes 28 so that the coated wire is in contact with the water only during its passage through the seal.

In Figs. 5 and 6, I have illustrated several modifications of the structure of the liner. In the modification shown by Fig. 5, a plurality of solid walled tubes 33 are laid end to end within the vulcanizing chamber and the ends of the tubes are flared outwardly, as shown at 34, to position the tube centrally of the chamber and to provide smooth surfaces for the passage of the coated wire. The flared ends of the tubes are provided with annularly arranged slots 35 which serve as drain openings. In this construction, the condensate collecting in the liner tubes will drain to the ends of the tubes and will then pass through the slots 35 to the bottom wall of the vulcanizing chamber for removal through the drain pipes 28 in the manner already described.

In the form of the invention illustrated by Fig. 6, the liner is composed of a spiral spring 36, several of which may be laid end to end within the vulcanizing chamber. The convolutions of the spring support the coated conductor at spaced points out of contact with the condensate. Since the corners of the spring convolutions are rounded off, there is no danger of damage to the coated conductor as it is drawn through the vulcanizing chamber.

What I claim as new and desire to secure by Letters Patent of the United States, is:

1. In an apparatus for manufacturing insulated wire, an elongated horizontal vulcanizing chamber, means for supplying steam to said chamber, means for passing a wire coated with vulcanizable material continuously through said chamber, and a liner in said chamber supporting the coated wire, spaced from the bottom of said chamber, said liner being provided with spaced passages whereby the steam condensate may flow therethrough to the bottom of said chamber so that the vulcanizable coating is maintained out of contact with the steam condensate.

2. In an apparatus for manufacturing insulated wire by a continuous process, an elongated horizontal vulcanizing chamber, a liner for said chamber, said liner having supporting surfaces spaced from the bottom wall of said chamber and extending along the length thereof, said supporting surfaces being separated from one another by passages, means for passing a wire coated with vulcanizable material continuously through said chamber, the wire being carried on the supporting surfaces of the liner out of contact with the said wall of the chamber and means for supplying steam to said chamber, the steam condensate passing through said passages and being collected along the bottom wall of said chamber out of contact with the vulcanizable coating.

3. In an apparatus for manufacturing insulated wire by a continuous process, an elongated horizontal vulcanizing chamber, a liner for said chamber comprising a tubular member spaced from the walls of said chamber and being provided with a plurality of openings therein, means for supplying steam to said chamber and to the interior of said tubular member, and means for passing a wire coated with vulcanizable material continuously through said chamber, the wire passing through and being supported by said tubular member, the steam condensate passing through the openings in said tube and draining to the bottom of said chamber out of contact with the vulcanizable coating.

4. In apparatus for applying a covering to a wire, an elongated horizontal vulcanizing chamber, means for supplying steam under pressure to said chamber, means for sealing opposite ends of said vulcanizing chamber, a drain connected to said chamber for removing steam condensate, means for passing a wire coated with vulcanizable material continuously through said sealing means and vulcanizing chamber, and supporting means in said vulcanizing chamber having a plurality of supporting surfaces spaced from the bottom wall of said chamber and extending along the length thereof, said supporting means being provided with a plurality of openings, the coated wire being supported by and moving along the spaced surfaces within the vulcanizing chamber in contact with the steam but out of contact with the steam condensate which flows through said openings for collection on the bottom wall of said vulcanizing chamber.

5. In apparatus for manufacturing insulated wire by a continuous process, an elongated vulcanizing chamber, means for supplying steam to said chamber under pressure, means for passing a wire coated with vulcanizable material continuously through said chamber, and a liner in said chamber extending along the length thereof, said liner having supporting surfaces spaced from a wall of said chamber on which condensate of the steam collects and said liner being provided with openings through which the condensate flows, the coated wire being carried on said supporting surfaces within the vulcanizing chamber in contact with the steam but out of contact with the condensate.

SAMUEL T. POWELL.